United States Patent
Pottorff

(10) Patent No.: US 6,196,827 B1
(45) Date of Patent: Mar. 6, 2001

(54) SWING ARM STABILIZING CAGE

(75) Inventor: Earl T. Pottorff, Savannah, NY (US)

(73) Assignee: Pearl Technologies, Inc., Savannah, NY (US)

( * ) Notice: Subject to any disclaimer, the term of this patent is extended or adjusted under 35 U.S.C. 154(b) by 0 days.

(21) Appl. No.: 09/208,731

(22) Filed: Dec. 9, 1998

(51) Int. Cl.$^7$ ................................................. B29C 47/90
(52) U.S. Cl. .................. 425/326.1; 425/384; 425/387.1; 425/392; 425/377; 425/403.1
(58) Field of Search ................................. 425/326.1, 384, 425/387.1, 392, 72.1, 377, 403.1; 264/209.4, 565, 209.5, 564, 569

(56) References Cited

U.S. PATENT DOCUMENTS

| | | | |
|---|---|---|---|
| 3,749,540 | * 7/1973 | Upmeir | 425/326 |
| 3,980,418 | * 9/1976 | Schott, Jr. | 425/455 R |
| 4,355,966 | 10/1982 | Sweeney et al. | 425/140 |
| 4,388,061 | 6/1983 | Bebok | 425/392 |
| 4,408,970 | 10/1983 | Bustin et al. | 425/72 R |
| 4,650,407 | * 3/1987 | Taguchi | 425/72 R |
| 4,717,323 | 1/1988 | Karl et al. | 425/72 R |
| 4,749,346 | * 6/1988 | Planeta | 425/72.1 |
| 4,793,790 | * 12/1988 | Reinhold | 425/325 |
| 4,815,957 | * 3/1989 | Schnell et al. | 425/140 |
| 4,943,226 | * 7/1990 | Pottorff | 425/326.1 |
| 5,585,120 | * 12/1996 | Pottorff | 425/72.1 |
| 5,700,489 | 12/1997 | Pottorff | 425/72.1 |
| 5,942,256 | * 8/1999 | Pottorff | 425/72.1 |
| 6,113,026 | * 9/2000 | Pottorff | 242/615.4 |

* cited by examiner

*Primary Examiner*—Harold Pyon
*Assistant Examiner*—Joseph S Del Sole
(74) *Attorney, Agent, or Firm*—Bernhard P. Molldrem, Jr.

(57) ABSTRACT

An external stabilizer employed in a plastic film blowing apparatus stacks of swing arm members that create an iris aperture for the extruded film bubble. A tubular die, fed with a supply of molten thermoplastic polymer, extrudes a tube of the molten polymer and injects air into the extruded tube to inflate the tube into a bubble. The wall of the tube expands into a film of a desired thickness; and the tube is drawn vertically upward and collapsed and flattened. The external stabilizer has a frame surrounding the extruded tube above the die. A plurality of swing arms arranged on said frame define the iris aperture. Each of the swing arms is an elongated extrusion of a light-weight material having one end mounted pivotally on the frame and a free end. The swing arm has a mushroom-shaped profile that is rounded on a side that faces the extruded tube. Wear resistant material is disposed on the front surface. The pivot arrangements are stacks of stackable members, each having a fitting for the associated arm and piping for supplying coolant to the swing arm. Cooling fluid travels first in a round tube portion and then back through a square tube portion of the swing arm extrusion. The swing arms can be pitched to create a helix angle that imparts a rotation to the extruded film bubble.

19 Claims, 4 Drawing Sheets

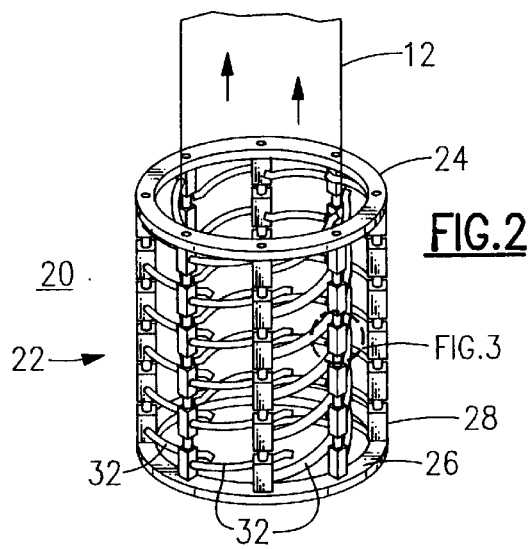
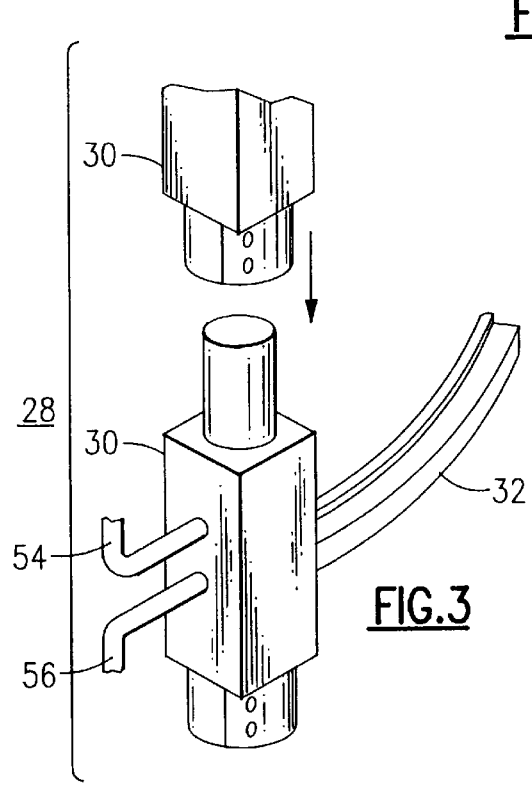
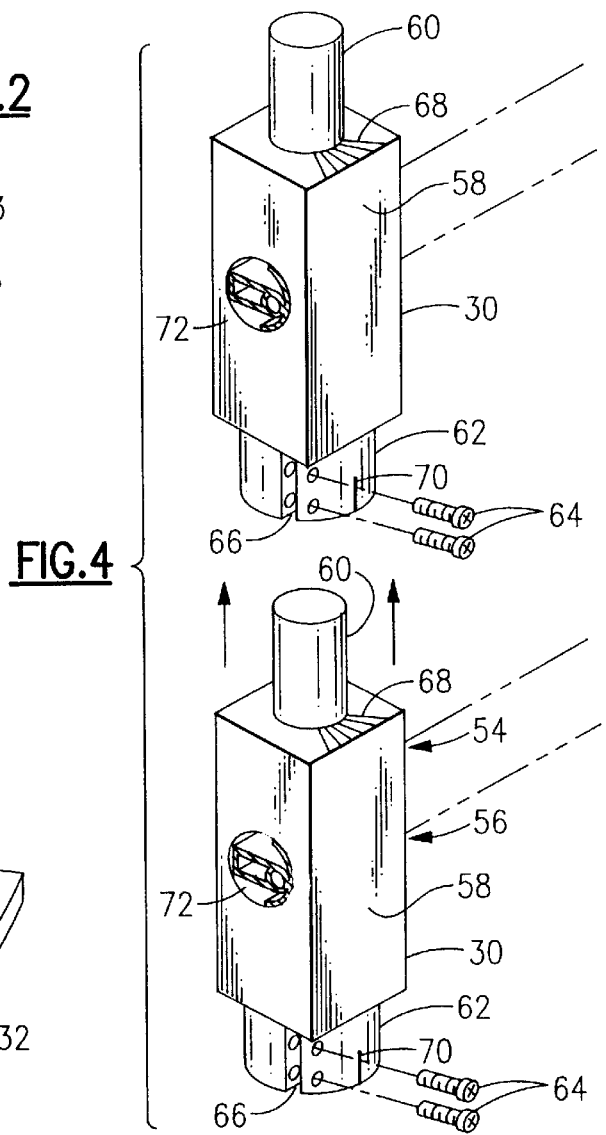

SWING ARM STABILIZING CAGE

BACKGROUND OF THE INVENTION

The present invention relates to the fabrication and processing of plastic film, and is more specifically directed to stabilizers for maintaining a tubular extrusion of blown plastic film, that is, a bubble, on a predetermined path during the extrusion process. The invention is more particularly concerned with improvements to an external guide or stabilizer arrangement that permits the aperture of the stabilizer to be adjusted, and which minimizes or eliminates problems caused by friction or film distortion as the extruded thermoplastic material is drawn through the guide stabilizer or sizing cage.

Polyethylene film or films of other thermoplastic materials are produced using a blown film process, in which molten thermoplastic material is fed to an annular extrusion die and the latter produces a tubular extrusion, i.e. bubble, of the material, which is drawn upwards and solidifies into film. An air jet incorporated in the die injects air into the interior of the extrusion to inflate the bubble or tube. The film in the extrusion is initially somewhat fluid, and inflates to a larger diameter, with a correspondingly thinner wall, cooling and solidifying when a predetermined thickness is reached. The process is controlled and adjusted so that the film has a uniform thickness, and this basic process is well known in the art. The tubular extrusion is drawn upwards and flattened between a pair of rollers, i.e., nip rollers, that are positioned above the die. Typically, a collapsing frame is provided to urge opposite sides of the tubular extrusion towards one another just before the tube reaches the nip rollers. The collapsing frame may consist of a pair of opposed arrays of horizontal collapsing boards of any of a number of well-known configurations, and one arrangement is discussed in U.S. Pat. No. 4,943,226, granted Jul. 24, 1990. The film exits the nip rollers as multiple-thicknesses of film, and the film proceeds from there to various cutting, printing, rolling, or other equipment.

As mentioned above, it is important that the thickness, as well as strength and other properties, of the produced film be as uniform as possible. It is also necessary to the quality of the film that it be relatively free of weak regions and tears. For those reasons, stabilizer arrangements are used to keep the tubular extrusion confined to a well-defined travel path as it proceeds from the die to the nip rollers. Guide cages or other external stabilizers can be positioned outside the bubble for this purpose. In some cases internal guide members can disposed atop the extrusion die and within the bubble, both to prevent the tubular extrusion from drifting off the axis of travel, and also to assist in the direction of air flow within the bubble from the die.

At the current time, an external stabilizer takes the form of a series of banks of bowed arms positioned at intervals around the tubular extrusion. In one arrangement that is often used, each arm carries a row of rollers made of PTFE (Teflon). The arms are positioned just out of contact with the bubble, or else in light contact. When the bubble or extrusion drifts laterally, i.e., away from its vertical axis, the film contacts the arms and rollers on that side. As the extrusion moves past the arms, the rollers turn, and also push the extrusion back towards the vertical axis. Unfortunately, the extruded plastic is highly abrasive, so that when the bubble moves vertically past the rollers at high speed, it tends to wear the rollers flat on one side. Also, because the rollers are positioned along a curve, the adjacent rollers touch on the bubble side, but are spaced from one another on the outer side of the arms. Therefore, there is a tendency for the rollers to pinch the film as it moves past, creating snags and tears. This is especially the case where the rollers exhibit wear and so that material has eroded away. Furthermore, it is difficult and expensive to replace worn PTFE rollers, and replacement typically involves replacing all the rollers along the entire bowed arm. In addition, the materials and construction involved make the external stabilizer of this design rather expensive.

While some previous constructions of bubble stabilizers have employed an array of arms configured as a variable iris aperture, these have employed bowed arms of rollers to guide the extruded tube. One example of this construction is shown in U.S. Pat. No. 4,815,957. The external stabilizers of this type are complicated and are difficult to maintain.

Another external stabilizer is described in U.S. Pat. No. 5,700,489, in which the stabilizer includes non-rotating bow arms of light-weight aluminum and a wear cover made of a wear resistant low-friction plastic material. There can be either a bank of curved bow arms or a spiral or helix member. This construction avoids the problems of the rollers as discussed above. However, there is no provision for easy adjustment of the aperture size or for creating an aperture that varies in radius from bottom to top.

A recognized problem in the blown film art is that blown film has different stretch and strength characteristics in the axial or machine direction from what is achieved in the transverse direction, i.e., circumferentially around the extrusion. This occurs because is has been difficult to control the expansion of the bubble in both directions at the same time. Ideally, the strength in the machine direction, or MD, should be the same as the strength in the transverse direction, or TD. Stabilizing the position of the extrusion or bubble would help in this regard. Also, controlling rotation of the bubble as it rises will affect these properties. However film materials of different composition, and films of different thickness may require more or less rotation, so some means should be provided to change the amount of rotation that the stabilizer induces onto the extruded bubble.

Also, previous stabilizer designs did not provide much attention to heat management, and did not control the cooling of the extruded bubble as it passed through the aperture of the sizing cage. In the case of the traditional roller-arm design, it is impossible to provide a flow of water or other coolant through the parts of the sizing cage that contact the film.

OBJECTS AND SUMMARY OF THE INVENTION

Accordingly, it is an object of this invention to provide an external guide cage for a blown film operation that avoids the drawbacks of the prior art.

It is another object of the invention to provide a film stabilizer arrangement that provides long life and significantly reduces friction and other related problems with respect to the extruded film that is being drawn therethrough.

It is yet another object to increase control over film temperature and bubble rotation, and thus obtain more uniform films.

According to an aspect of the present invention, improved external stabilizer and sizing cage means are provided for plastic film blowing apparatus of the type in which a tubular extrusion die is fed with a supply of a molten thermoplastic polymer and extrudes a tube of the molten polymer. The die injects air to inflate the tube and expand the wall of the tube into a film of a predetermined film thickness. Nip roller means positioned above the die at the top of the bubble draw the tube vertically upward from the die and collapse and flatten the film. The improved external stabilizer arrangement is positioned on a frame surrounding the extruded tube above the die means to keep the tube aligned on a predetermined path as the tube is drawn upwards, and has a plurality of swing arms arranged on the frame to define an iris aperture. Pivot means on the frame swing the arms toward and away from the bubble axis to reduce and increase the size of the aperture. In the embodiments of the invention, each such swing arm includes an elongated extrusion of a light-weight material (e.g., aluminum or aluminum alloy) having a pivot end mounted to pivot means on the frame and a free end. These swing arms, being rigid, unitary extrusions, are pivoted only at ends remote from the extruded tubes and, in addition, a portion of the unitary extrusion not axially offset from the pivot end and situated between the pivot end and the free end of the extrusion defines the iris aperture (as shown in the figures). This extrusion has a profile that is rounded on a side that faces the extruded tube so that the elongated extrusion has a rounded front, or film-facing surface. A wear resistant material is situated on the rounded front surface of the extrusion, such that the extruded tube of film slides over the wear material. The wear material can take the form of a low-friction plastic wear cap or cover having a profile that matches the shape of the front side of the aluminum extrusion. The plastic wear covers can be replaced when worn simply by snapping or sliding them off and replacing them in similar fashion with fresh wear covers. Alternatively, the metal extrusions can be provided with a low-friction, wear-resistant surface treatment rather than the plastic wear cover.

In several preferred embodiments, the arms each have a straight portion at the pivot end, a bowed portion after the straight portion, and a recurve portion at the free end. The bowed portion has a center of curvature on the side towards said polymer tube and the recurve portion has a center of curvature on the side away from the polymer tube.

A flow of a coolant, such as water, can be provided through channeling in the interiors of the extruded metal arms for controlled cooling. Preferably, the swing arm extrusion has a generally mushroom-shaped profile with a curved cap portion forming its rounded front surface, and a stem portion behind it. The stem portion is formed of first and second extruded tubes, and one can be connected with coolant supply piping and the other connected with coolant return piping.

Preferably, each swing arm has a pivot member in the form of a stackable segment having a body portion, a pin member on one end, and a clamp member situated on the opposite end. These can have index marks (e.g., at 1/32" increments) so that the stacking segment can be aligned or offset, as desired, with respect to the one just above and the one just below.

The above and many other objects, features, and advantages of this invention will become apparent from the ensuing description of an exemplary embodiment, which should be read in conjunction with the accompanying Drawing.

BRIEF DESCRIPTION OF THE DRAWING

FIG. 2 is a perspective view of the stabilizer according to an embodiment of the invention.

FIG. 3 is an enlargement of a portion of FIG. 2.

FIG. 4 is an assembly view showing stacking segments of this embodiment.

DETAILED DESCRIPTION OF THE PREFERRED EMBODIMENTS

Figure 1:
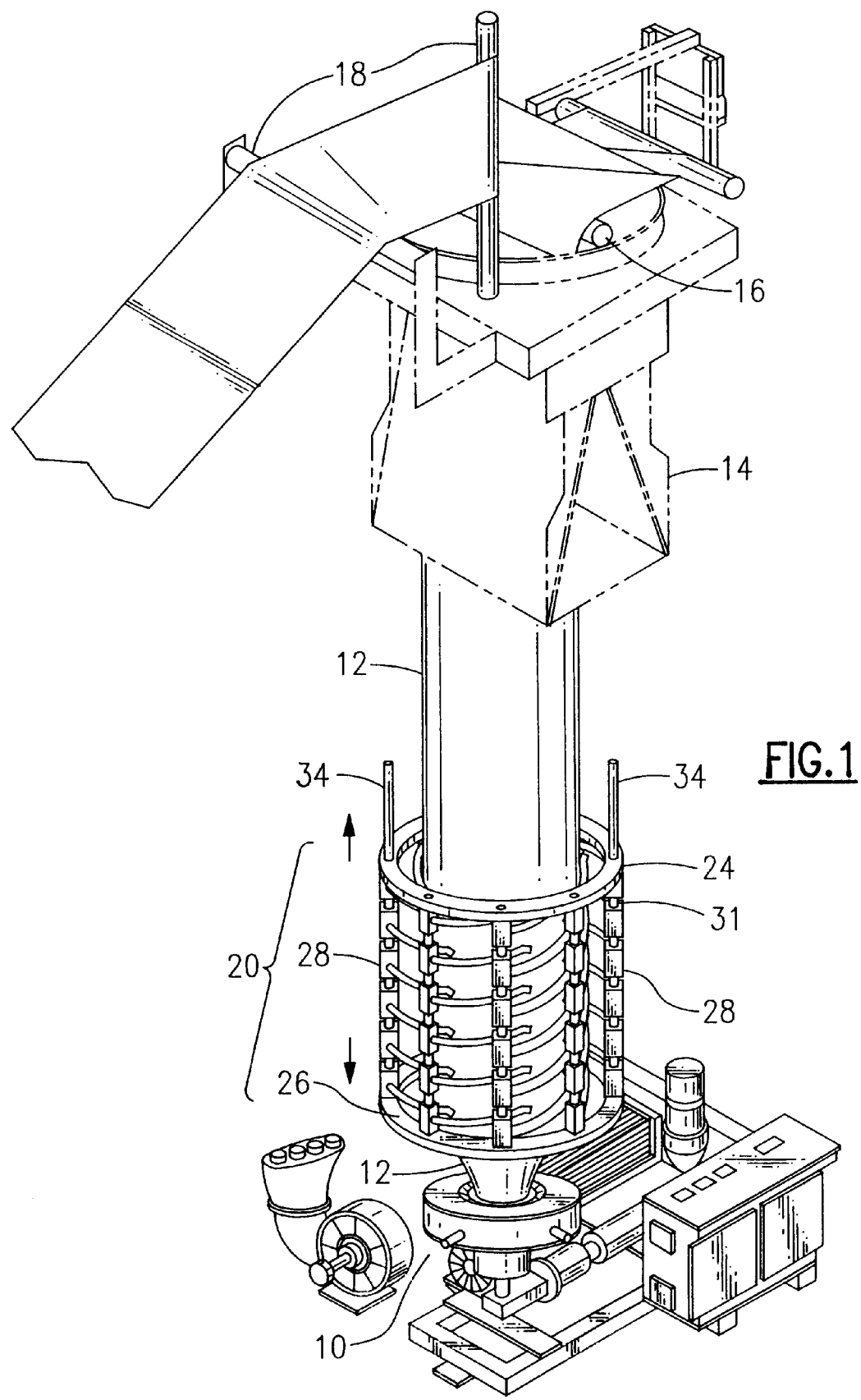
FIG. 1 is a perspective view of a blown film extrusion arrangement showing an external stabilizer or sizing cage of the prior art.

With reference to the Drawing, FIG. 1 illustrates a blown film extrusion assembly that includes an external stabilizer of this invention and may also include an internal stabilizer (not shown) according to the prior art. Here an extrusion die 10 is supplied with a molten thermoplastic material, e.g. polyethylene, polypropylene, PVC, or another thermoplastic resin. The die 10 has a circular or annular opening, and an air injection jet is disposed within the opening. The die 10 produces an extruded tube 12 or bubble of the molten material, which is drawn upwards and inflates until the wall of the extrusion is expanded to a design thickness. The film thickness can typically be in a range from about 0.3 mils to several mils, depending on the intended end use for the plastic film. In many instances, the die 10 is rotated during extrusion so as to avoid longitudinal weak areas and to increase the film strength in the transverse direction (TD). As the film is drawn upwards, the tube 12 must be flattened, and so a collapsing frame 14 is provided well above the die 10 to urge opposite sides of the tubular extrusion 12 towards one another. A suitable design for a collapsing frame is described in U.S. Pat. No. 4,943,226. A pair of nip rollers or pinch rollers 16 are disposed above the collapser to flatten the tube into a multiple thickness of film. These nip rollers also draw the extrusion or bubble upward at a controlled rate. The elevation of the nip rollers above the die 10 can be forty feet or more. An arrangement 18 of guide rollers directs the travel of the film to a subsequent processing stage, which is not shown here.

As the tubular extrusion 12 is drawn vertically upwards, the air within the tube expands the tube outward until the thermoplastic material sets. Typically there is a so-called "frost line" on the moving extrusion at the vertical position where the plastic has cooled and can no longer be expanded.

Because of the great distance from the die 10 to the nip rollers 16, the travel path of the tubular extrusion can drift away from the axis between the die and rollers. This drift can lead to unacceptable irregularities, e.g., weak regions, tears, or pulls in the film product. For that reason, the blown film arrangement typically will employ means to stabilize the path of vertical travel of the extrusion 12. This can be below the frost line where expansion occurs, as well as above the frost line. These means can include internal stabilizers, external stabilizers, or some combination of the two. Here, an external stabilizer 20 is employed above the frost line to control or limit transverse drift. Because of the heat carried by the molten plastic, some type of heat management is needed for the external stabilizer 20. In the absence of heat removal, the heat of the extrusion can accumulate and can actually damage the film, or can damage the equipment, including the external stabilizer.

In this arrangement, the external stabilizer 20 incorporates a frame 22 (See FIG. 2) comprising at least an upper ring 24 and a lower ring 26, with a number of stabilizer stacks 28 disposed at regular intervals, here, for example intervals of 45 degrees, so that there are eight of these stacks 28. Each stack is made up of two or more stack segments 30 joined end to end (See FIGS. 3 and 4), and each of which carries a swing arm 32. Each arm has a pivot end mounted in the stack segment, a straight portion, a bowed or curved or portion that contacts the extrusion or bubble 12, and a recurve portion at the free end that curves away from the bubble. This is discussed below in reference to FIG. 5. The frame 22 can include a mechanism to rotate the stacks 28 to swing the arms 32 in or out to accommodate the size of the plastic film extrusion or bubble 12. This can be an inextensible belt drive 31 surrounding the frame 22 and contacting toothed timing wheels, for example, on the respective stacks 28. Alternatively, a gear mechanism could be employed. The arms 32 pivot in or out so as to define an iris aperture about the axis of the tubular extrusion. The size of this aperture is selected for the extrusion size and the polymer material.

Also shown in FIGS. 1 and 2 is a set of rotatable vertical threaded rods 34 that pass through female threaded members or threaded openings in the frame 22. These are rotated to elevate or lower the stabilizer 20 in respect to the extruded bubble so as to optimize the vertical positioning of the stabilizer.

Figure 5:
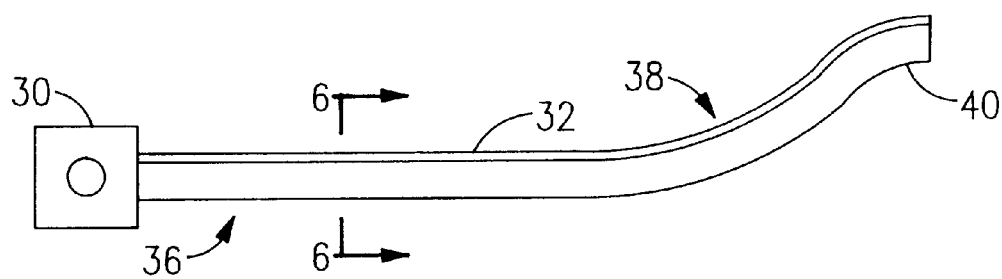
FIG. 5 is a plan view of one of the swing arms this embodiment.
Figure 6:
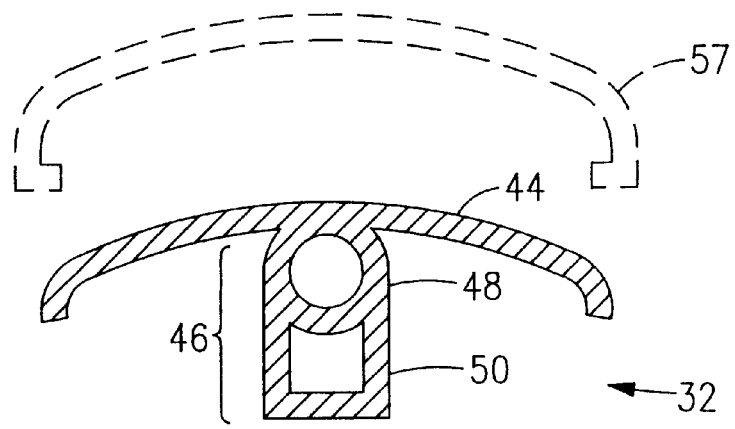
FIG. 6 is a cross-section of the swing arm of this embodiment taken at 6—6 of FIG. 5.
Figure 7:
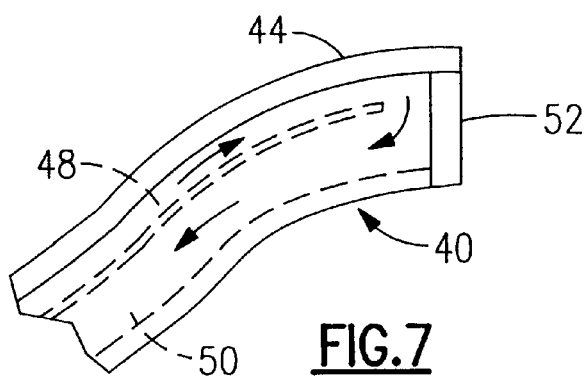
FIG. 7 explains coolant flow through the swing arm.

As shown in FIG. 5, each arm 32 has a straight portion 36 extending from the pivot end (here held in stack segment 30) for about half the length of the arm. Then there is a curved portion 38 that is curved in the circumferential direction about the axis of the extrusion 12, and then a short recurve portion 40 at the free end, i.e., curved away from the extrusion axis. As seen in cross-section in FIG. 6, the swing arm 32 can favorably have a mushroom-shaped profile. This can be extruded of aluminum or an aluminum alloy or other lightweight material. This is similar to the profile of the bow arm shown in commonly assigned co-pending U.S. patent application Ser. No. 09/192,343, now U.S. Pat. No. 6,113,026 filed Nov. 16, 1998. As seen in cross section, the arm 32 has a top or cap portion 44 with an arcuate cross section. A stem portion 46 disposed behind this has a round tubular portion 48 adjacent to the cap portion 44 and actually merged into it. There is also a square tubular portion 50 directly behind the round tubular portion 48. In some embodiments, a liquid coolant, e.g., water, can flow through the round tubular portion 48, and then return through the square portion 50. As shown in FIG. 7, an end cap 52 can be fitted at the free end of the swing arm 32, so that there is a coolant path defined within the arm, with the round tube portion 48, adjacent the cap portion 44, serving as the main heat exchange tube and the square tube 50 serving as the return conduit. Piping is provided to each of the stacking segments 30, including a supply tube 54 and a return tube 56, as shown in FIG. 3. These are connected by means of hoses and tubes to coolant supply and return reservoirs (not shown). In a preferred mode, the coolant is connected in series to the swing arms in each stack, so that return tube 56 of one stacking segment 30 feeds the supply tube 54 of the next adjacent stacking segment.

The cap or cover portion 44 of each of the swing arms 32 is provided with a low-friction, wear resistant surface. In some favorable embodiments, a low-friction surface treatment is incorporated into the film-facing surface of this cap portion. Many suitable low-friction treatments are known, including hard coats, ceramic impregnations, and other similar techniques. A surface treatment that has been found to be highly suited for this is known as SM-24, available from Luke Engineering of Wadsworth, Ohio. Alternatively, the cap portion of the extruded swing arm can be fitted with a removable wear cover 57, shown in ghost. This may have a profile similar to that of the arcuate cap portion 44, and is adapted to snap in place onto the arcuate portion 44. The wear cover can be extruded or molded of a low-friction, semi-rigid plastic material, one example of which is Delrin filled with a lubricant filler. Several examples of suitable materials are discussed in my earlier U.S. Pat. Nos. 5,700,489 and 5,585,120. When the wear cover becomes worn or damaged, it can be removed and replaced quickly, as it snaps off and the replacement cover can be snapped into place. The replacement operation takes only a few minutes. The above cited patents and co-pending application Ser. No. 09/192,343 are incorporated herein by reference.

Some details of the stacking segments 30 can be explained in respect to FIGS. 3 and 4. As shown, the segments 30 each have a central block-shaped body portion 58 with a cylindrical pin member 60 disposed at an upper end of the body portion and a sleeve fitting 62 at its lower end. The sleeve fitting serves as a clamp member for non-rotationally gripping the pin member of next stackable segment below it. There are two threaded screw members 64 that screw into screw holes adjacent a slot 66 to serve as a screw pinch member to bind the sleeve to the pin member of the adjacent segment. As is also shown, the body portion 58 is marked with indicia so that the angular position of the segment relative to the next segment can be established. There are matching indicia 70 on the clamp portion 62. These can be incremented, e.g., at one-degree intervals or at $\frac{1}{32}$-inch intervals, and serve as scale angulation indicia for permitting adjacent stacked segments to be angularly offset from one another by a selected amount.

The pivot end of the associated swing arm 32 is fitted into a suitably shaped opening 72 in the body of the stacking segment, on the side opposite the coolant piping 54, 56.

The stackable segments 30 each include suitable cavities and pathways for linking the coolant inlet pipe 54 and a coolant outlet pipe 56 to the round and square tube portions 48, 50 of the associated swing arm 32.

Figure 8:
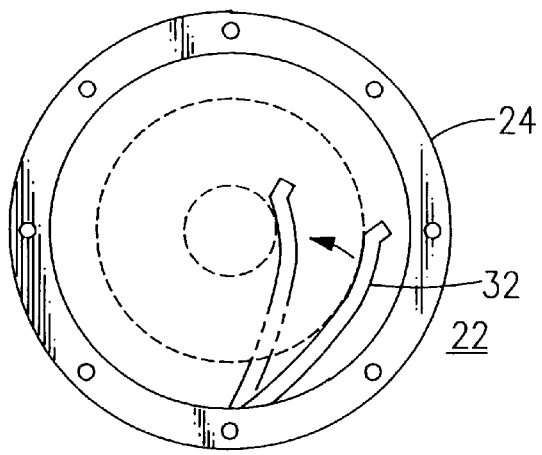
FIGS. 8, 9, and 10 are plan views showing swing arm positions for various size iris apertures.
Figure 9:
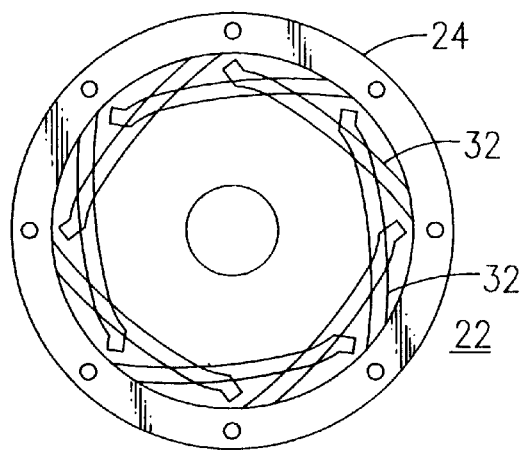
Figure 10:
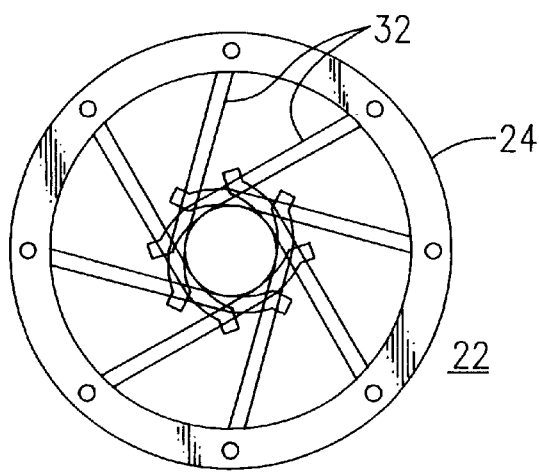

As stated before, the stacking segments 30 in each stack 28 are mechanically locked to one another to rotate or pivot together between the upper and lower ring members 24, 26. Also, the various stacks 28 are all mechanically coupled together by means of a belt, gearing, or other linkage, so that they all swing together to change the aperture size of the stabilizer 20. As shown in FIG. 8, each swing arm 32 (only one is shown here) in each row can be pivoted outward (as in solid lines) for a large iris aperture, or can be pivoted inward (as shown in broken line) towards the bubble axis for a smaller iris aperture. The configuration of the swing arms at a given level can be open for a large iris aperture (FIG. 9) or can be closed in for a smaller iris aperture (FIG. 10). Because the stacking segments 30 in each stack 28 can be angularly offset from one another, the iris aperture can open or close gradually from one level or row to the next.

As shown in FIG. 2, the swing arms 32 can be angled slightly upwards from their mounts on the respective stacking segments. This orients the swing arms 32 at a predetermined non-zero helix angle, and can induce rotation of the extruded tube or bubble 12 as the same is drawn upwards past the external stabilizer 20. The segments 30 can provide for adjustment of the pitch, so that the helix angle can be changed when necessary.

In a preferred mode, coolant water is fed first to the top row of swing arms 32, and then to each row beneath in series, proceeding in through the round tube 48 and then out through the square tube 50. In a practical operation, where the intake water for the top row is at a temperature of 40 degrees F, the discharge water from the bottom row is 140 degrees F. This degree of cooling of the film improves the quality of the film, and creates more consistent film, resulting in less scrap or spoilage in subsequent manufacturing steps. Cooling also reduces the coefficient of friction of the surface treatment on the film-facing surface of the swing arm 32. The type of surface treatment on the swing arm, or the need to use or not to use wear covers, depends on the type of film material being processed.

Other possible cross sectional shapes of extrusion and wear cover could be used, so long as the stabilizer arms present a smooth sliding surface of low-friction material to the tubular extrusion 12 that moves through it. The coolant in this example is water, but another liquid coolant may be used, as may be air or another gas, as appropriate.

While this invention has been described in detail with reference to selected preferred embodiments, it should be recognized that the invention is not limited to those embodiments. Rather, many modifications and variations will present themselves to persons skilled in the art without departing from the scope and spirit of the invention.

What is claimed is:

1. An external stabilizer arrangement employed in a plastic film blowing apparatus in which a tubular die, fed with a supply of molten thermoplastic polymer, extrudes a tube of the molten polymer and which injects air into said extruded tube to inflate the tube and expand the tube into a film of a desired thickness; and wherein means are positioned above said die for drawing the tube vertically upward along a vertical axis and collapsing and flattening the film; the external stabilizer arrangement being positioned on a frame surrounding the extruded tube above said die to keep the tube aligned on a predetermined path as the tube is drawn upwards, and comprising a plurality of swing arms arranged on said frame to define an iris aperture, and means on said frame to swing said arms toward and away from said axis to reduce and increase the size of the aperture, such that said swing arms are pivoted only at ends thereof remote from the extruded tube; comprising the improvement wherein each said swing arm is formed as an elongated unitary extrusion of a light-weight material having a pivot end mounted pivotally on said frame and a free end remote from said pivot end, with a portion of the extrusion not axially offset from said pivot end and situated between said pivot end and said free end of said swing arm that contacts the extruded tube and defines said iris aperture, and said portion of the extrusion having a profile that is rounded on a side that faces the extruded tube so that said extrusion has a rounded front surface; and a wear resistant material disposed on said rounded front surface of said extrusion, such that said tube slides therepast.

2. The external stabilizer arrangement of claim 1, wherein said light-weight material is aluminum.

3. The external stabilizer arrangement of claim 2, wherein the wear-resistant material on said rounded front surface includes a low-friction surface treatment.

4. The external stabilizer arrangement of claim 2, wherein the wear-resistant material on said rounded front surface includes a wear cover removably fitted onto said front surface.

5. The external stabilizer arrangement of claim 2, wherein said swing arm extrusion has a mushroom-shaped profile with a curved cap portion forming said rounded front surface, and a stem portion therebehind.

6. The external stabilizer arrangement of claim 5, wherein the stem portion includes first and second extruded tubes formed therein.

7. An external stabilizer arrangement employed in a plastic film blowing apparatus in which a tubular die, fed with a supply of molten thermoplastic polymer, extrudes a tube of the molten polymer and which injects air into said extruded tube to inflate the tube and expand the tube into a film of a desired thickness; and wherein means are positioned above said die for drawing the tube vertically upward along a vertical axis and collapsing and flattening the film; the external stabilizer arrangement being positioned on a frame surrounding the extruded tube above said die to keep the tube aligned on a predetermined path as the tube is drawn upwards, and comprising a plurality of swing arms arranged on said frame to define an iris aperture, and means on said frame to swing said arms toward and away from said axis to reduce and increase the size of the aperture; comprising the improvement wherein each said swing arm is formed as an elongated rigid extrusion of a light-weight material having a pivot end mounted pivotally on said frame and a free end remote from said pivot end, with a portion of the extrusion situated between said pivot end and said free end of said swing arm that contacts the extruded tube and defines said iris aperture, and said portion of the extrusion having a profile that is rounded on a side that faces the extruded tube so that said extrusion has a rounded front surface; and a wear resistant material disposed on said rounded front surface of said extrusion, such that said tube slides therepast, wherein each said elongated rigid extrusion has a straight portion at the pivot end, a bowed portion after the straight portion, and a recurve portion at the free end, said bowed portion having a center of curvature on the side towards said polymer tube and said recurve portion having a center of curvature on the side away therefrom.

8. An external stabilizer arrangement employed in a plastic film blowing apparatus in which a tubular die, fed with a supply of molten thermoplastic polymer, extrudes a tube of the molten polymer and which injects air into said extruded tube to inflate the tube and expand the tube into a film of a desired thickness; and wherein means are positioned above said die for drawing the tube vertically upward along a vertical axis and collapsing and flattening the film; the external stabilizer arrangement being positioned on a frame surrounding the extruded tube above said die to keep the tube aligned on a predetermined path as the tube is drawn upwards, and comprising a plurality of swing arms arranged on said frame to define an iris aperture, and means on said frame to swing said arms toward and away from said axis to reduce and increase the size of the aperture; comprising the improvement wherein each said swing arm is formed as an elongated unitary extrusion of a light-weight material having a pivot end mounted pivotally on said frame and a free end remote from said pivot end, with a portion of the extrusion between said pivot end and said free end of said swing arm that contacts the extruded tube and defines said iris aperture, and said portion of the extrusion having a profile that is rounded on a side that faces the extruded tube so that said extrusion has a rounded front surface; and a wear resistant material disposed on said rounded front surface of said extrusion, such that said tube slides therepast, wherein said frame includes upper and lower ring members, with said pivot means being disposed between said ring members, and said pivot means including means for affixing the pivot ends of said swing arms.

9. The external stabilizer arrangement of claim 8, wherein said pivot means includes a set of pivot members in which said swing arms are respectively mounted, each said pivot member being pivotally mounted in respect of said upper and lower ring members.

10. The external stabilizer arrangement of claim 9, wherein each said pivot member has a coolant inlet and a coolant outlet for connecting to a coolant supply and a coolant return, said pivot member further including means connecting said inlet and outlet to coolant channels within the respective swing arm.

11. An external stabilizer arrangement for a plastic film blowing apparatus in which a tubular die, fed with a supply of molten thermoplastic polymer, extrudes a tube of the molten polymer and which injects air into said extruded tube to inflate the tube and expand the tube into a film of a desired thickness; and wherein means are positioned above said die for drawing the tube vertically upward and collapsing and flattening the film; the external stabilizer arrangement comprising frame means surrounding the extruded tube above said die; and a plurality of swing arms arranged on said frame that contact said extruded tube to define an iris aperture coaxial with said extruded tube, and means on said frame to swing said arms toward and away from said axis to reduce and increase the size of the aperture; said swing arms each having a pivot end supported in said frame and a free end remote from said pivot end, and each said swing arm being rigid between said pivot end and said free end, with a portion of each said rigid swing arm between said pivot end and said free end defining said iris aperture and contacting said extruded tube, and each said swing arm having a profile that is rounded on a side that faces the extruded tube between said pivot end and said free end so as to define a rounded front surface, with a wear resistant material disposed on said rounded front surface; and wherein said swing arms are oriented at a predetermined non-zero helix angle to induce rotation of said extruded tube as the same is drawn upwards past said external stabilizer arrangement.

12. The external stabilizer of claim 11 wherein each said swing arm has a mushroom-shaped cross section.

13. The external stabilizer of claim 11 wherein each said swing arm has a straight portion at a pivot end thereof, an intermediate bowed portion that curves circumferentially around said extruded tube, and a recurve portion at a free end thereof that curves away from said extruded tube.

14. An external stabilizer arrangement for a plastic film blowing apparatus in which a tubular die, fed with a supply of molten thermoplastic polymer, extrudes a tube of the molten polymer and which injects air into said extruded tube to inflate the tube and expand the tube into a film of a desired thickness; and wherein means are positioned above said die means for drawing the tube vertically upward and collapsing and flattenning the film; the external stabilizer arrangement comprising frame means surrounding the extruded tube above said die; and a plurality of swing arms supported on said frame means and having pivot ends disposed circumferentially about said frame means; each said swing arm having a profile that is rounded on a side that faces the extruded tube to define a rounded front surface with a wear resistant material non-rotationally disposed on said rounded front surface; and including a plurality of pivot members pivotally supporting the pivot ends of respective ones of said swing arms on said frame means, each said pivot member including at least one stackable segment having a body portion, a pin member at one end of said body portion, and a clamp member disposed at an opposite end of said body portion including means for non-rotationally gripping the pin member of another stackable segment.

15. The external stabilizer of claim 14 wherein said stackable segments each include a coolant inlet and a coolant outlet for circulating liquid coolant to internal cavities in the respective swing arm.

16. The external stabilizer of claim 14 wherein said stackable segments each include scale angulation indicia for permitting adjacent stackable segments to be angularly offset from one another by a selected amount.

17. The external stabilizer of claim 14 further comprising a plurality of vertical threaded members passing through said frame means, and means rotating said threaded members for selectively raising and lowering said stabilizer arrangement relative to said extruded tube.

18. The external stabilizer of claim 14 wherein said pin member is a cylindrical member with a vertical axis.

19. The external stabilizer of claim 18 wherein said clamp member includes a sleeve member that fits over the pin member of an adjacent stackable segment, and includes a screw pinch member to bind said sleeve to the pin member of the adjacent segment.

* * * * *